United States Patent
Hiroishi

(10) Patent No.: US 10,974,569 B2
(45) Date of Patent: Apr. 13, 2021

(54) AIR CONDITIONING UNIT

(71) Applicant: FH alliance Inc., Kasugai (JP)

(72) Inventor: Kazuro Hiroishi, Kasugai (JP)

(73) Assignee: FH ALLIANCE INC., Kasugai (JP)

( * ) Notice: Subject to any disclaimer, the term of this patent is extended or adjusted under 35 U.S.C. 154(b) by 91 days.

(21) Appl. No.: 16/214,402

(22) Filed: Dec. 10, 2018

(65) Prior Publication Data
US 2019/0176577 A1    Jun. 13, 2019

(30) Foreign Application Priority Data

Dec. 11, 2017  (JP) .............................. JP2017-236589

(51) Int. Cl.

| | |
|---|---|
| *F25D 17/04* | (2006.01) |
| *B60H 1/32* | (2006.01) |
| *B60H 3/00* | (2006.01) |
| *F24F 1/0043* | (2019.01) |
| *F24F 1/0007* | (2019.01) |
| *F24F 1/0018* | (2019.01) |
| *F25D 1/00* | (2006.01) |
| *F25B 1/00* | (2006.01) |

(52) U.S. Cl.
CPC ............. *B60H 1/3204* (2013.01); *B60H 3/00* (2013.01); *F24F 1/0007* (2013.01); *F24F 1/0018* (2013.01); *F24F 1/0043* (2019.02); *F25D 17/04* (2013.01); *B60H 1/3233* (2013.01); *F25B 1/00* (2013.01); *F25D 1/00* (2013.01)

(58) Field of Classification Search
CPC ....... F24F 1/0007; F24F 1/0018; F24F 1/0043
See application file for complete search history.

(56) References Cited

U.S. PATENT DOCUMENTS

| | | | | |
|---|---|---|---|---|
| 4,449,376 A | * | 5/1984 | Draper .................... | F25B 39/00 62/259.1 |
| 5,857,343 A | * | 1/1999 | Cho ....................... | F24F 1/0007 62/89 |

(Continued)

FOREIGN PATENT DOCUMENTS

| | | |
|---|---|---|
| JP | 2012-057880 A | 3/2012 |
| JP | 2017-150704 A | 8/2017 |

OTHER PUBLICATIONS

Hiroishi, Air Conditioning system for a house, Mar. 2012; eSpacenet; 2012-057880, description (Year: 2012).*

(Continued)

*Primary Examiner* — Filip Zec
(74) *Attorney, Agent, or Firm* — Kratz, Quintos & Hanson, LLP

(57) ABSTRACT

In an air conditioning unit, a chamber 3 is provided therein with a divider 36, 38 which divides an interior of the chamber 3 into one space where the air conditioner 20 is placed and the other space where the blowers 5 are placed, the air conditioning unit further comprises an air inflow port 32 for introducing the air from outside of the chamber 3 into the one space, and the divider 36, 38 forms a divider opening 42, and therefore, it is an object of the present invention to provide an air conditioning unit capable of mixing, with each other, air which is blown out from an air conditioner and whose temperature is adjusted and air which bypasses the air conditioner and whose temperature is not adjusted.

4 Claims, 5 Drawing Sheets

(56) References Cited

U.S. PATENT DOCUMENTS

| | | | | |
|---|---|---|---|---|
| 6,176,306 B1 * | 1/2001 | Gault | ............... | F24D 19/1087 |
| | | | | 165/240 |
| 9,328,939 B2 * | 5/2016 | Edens | ............... | F24F 1/0007 |
| 9,803,888 B2 * | 10/2017 | Snow | ............... | F24H 9/06 |
| 2005/0034472 A1 * | 2/2005 | Hong | ............... | F24F 1/005 |
| | | | | 62/317 |
| 2006/0174560 A1 * | 8/2006 | Levine | ............... | F24F 13/32 |
| | | | | 52/200 |

OTHER PUBLICATIONS

Office Action of Japanese Patent Application No. 2017-236589: Notification of Reasons for Rejection dated Jan. 14, 2020 (2 sheets, 5 sheets translation, 7 sheets total).

Office Action of Japanese Patent Application No. 2017-236589: Notice of Reasons for Rejection dated Mar. 31, 2020 (5 sheets, 5 sheets translation, 10 sheets total).

\* cited by examiner

[Fig. 1]
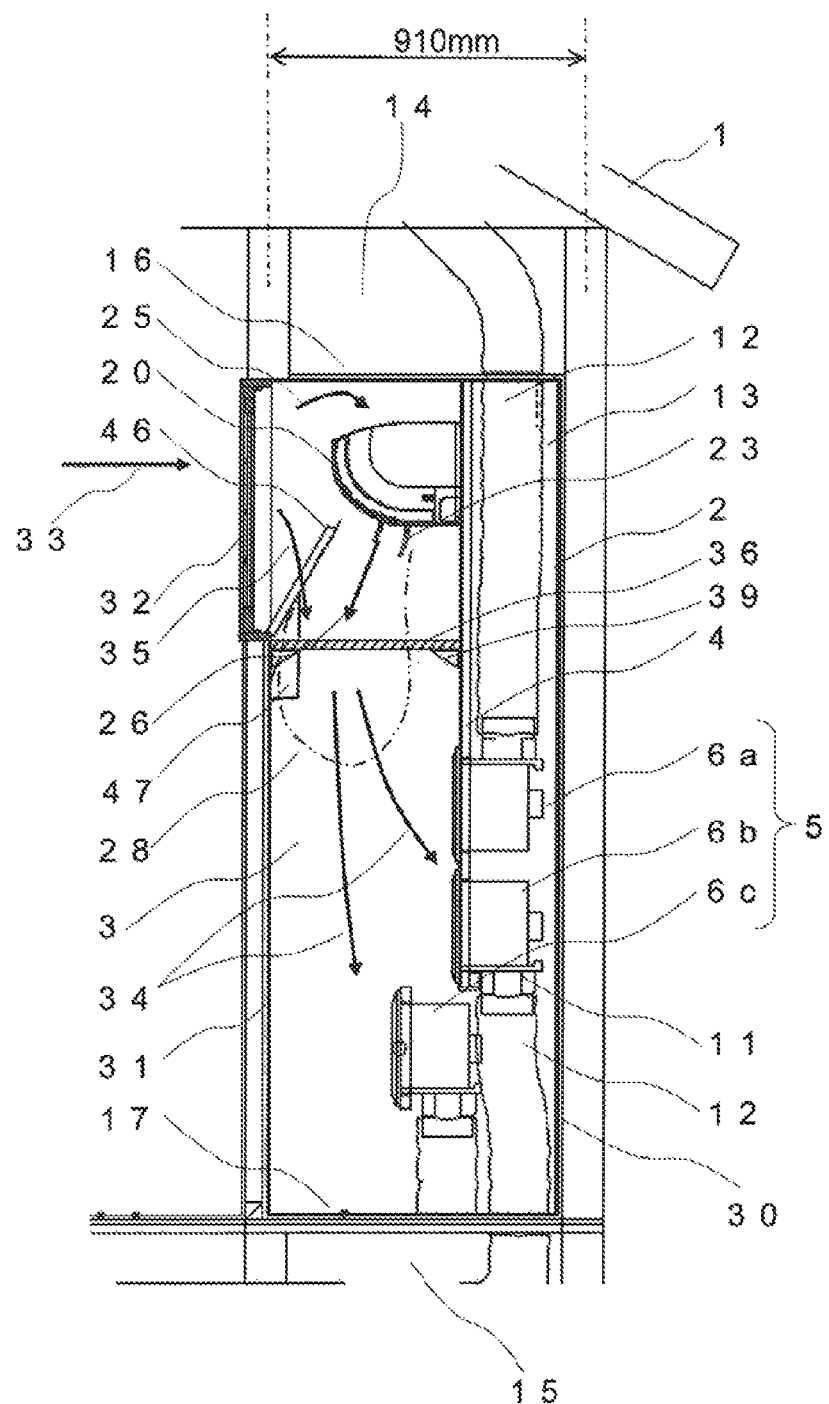

[Fig. 2]
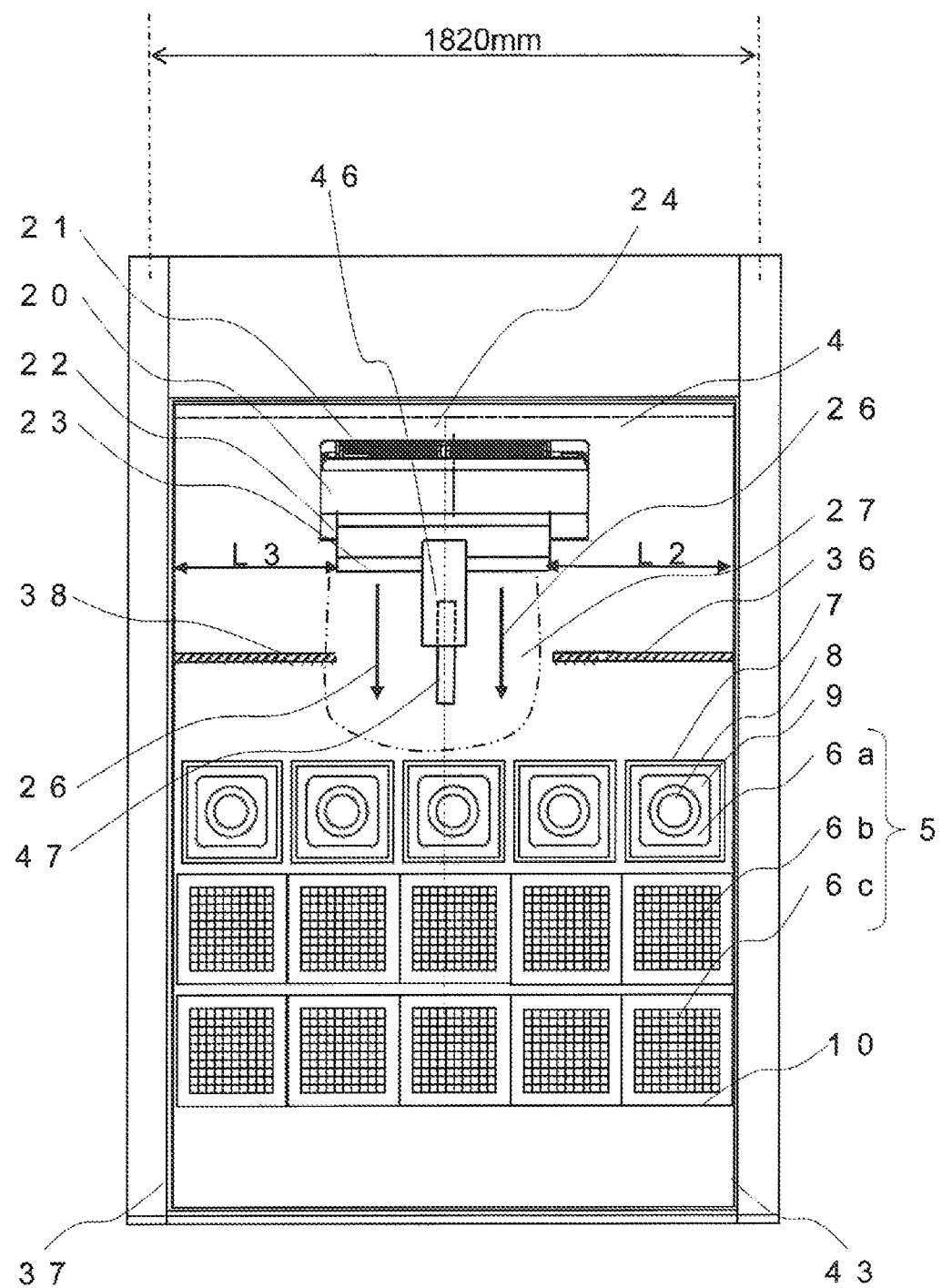

[Fig. 3]
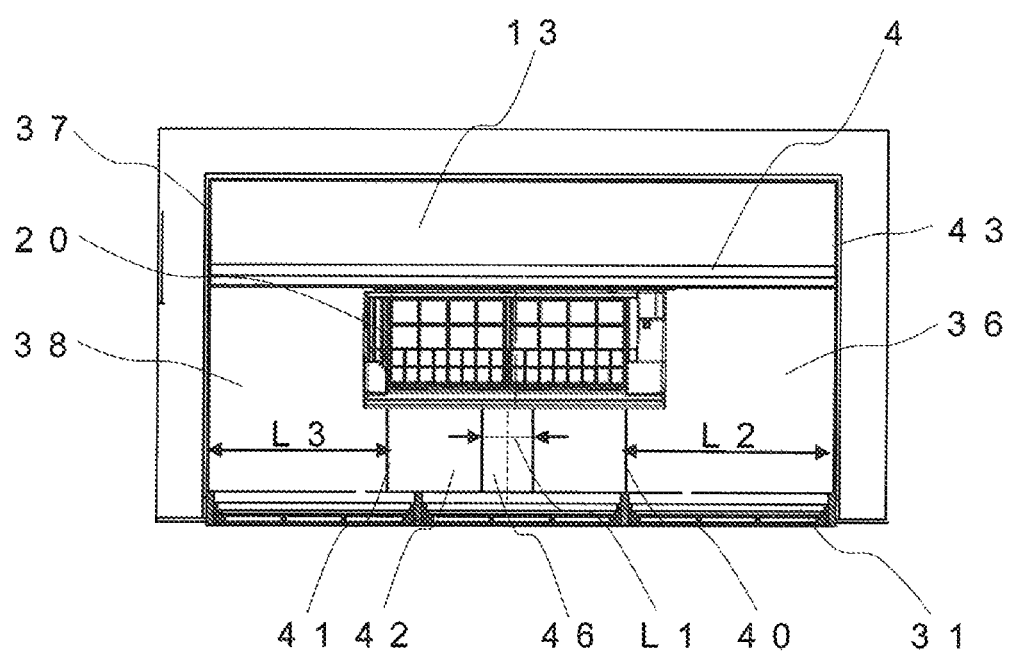

[Fig. 4]
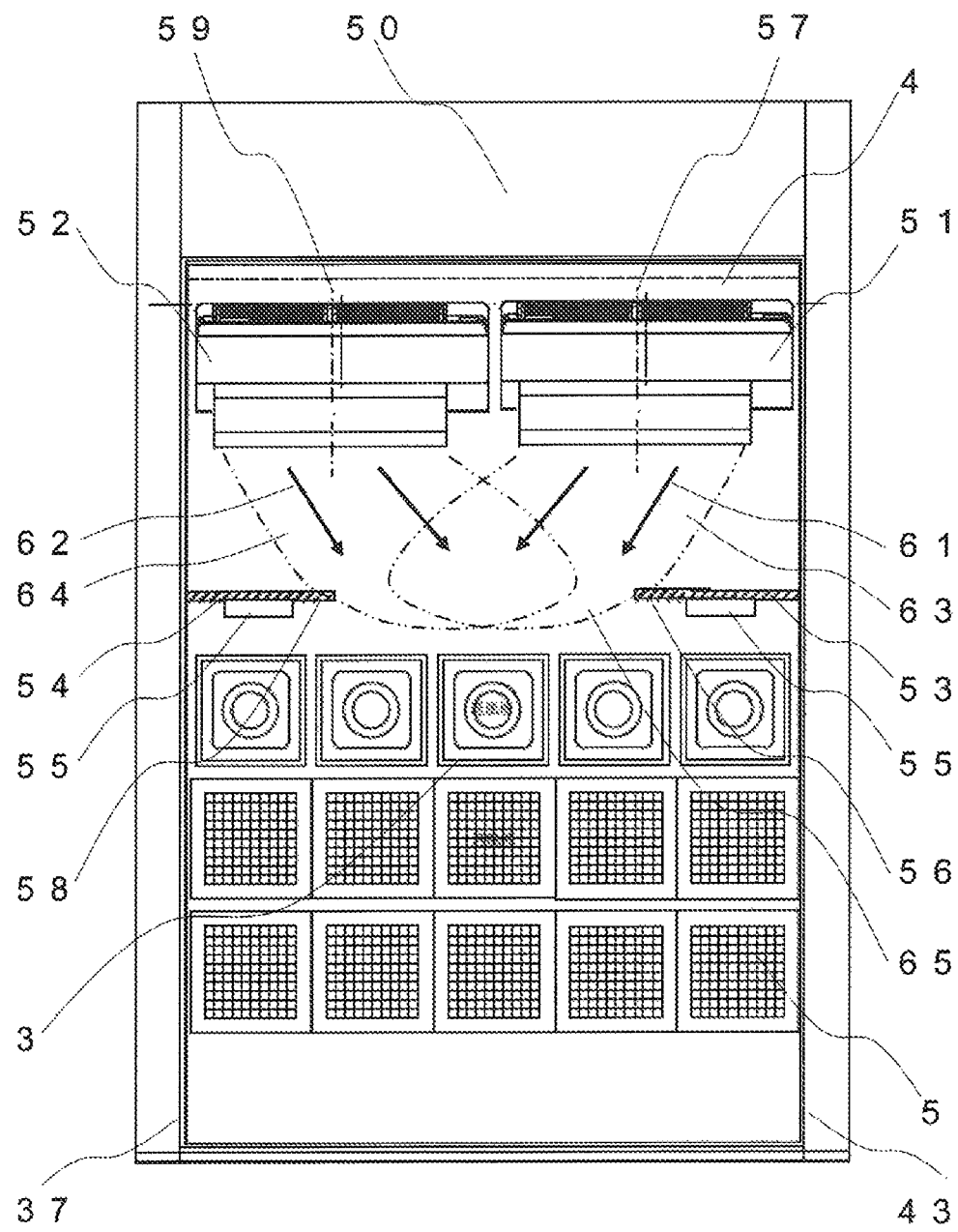

[Fig. 5]
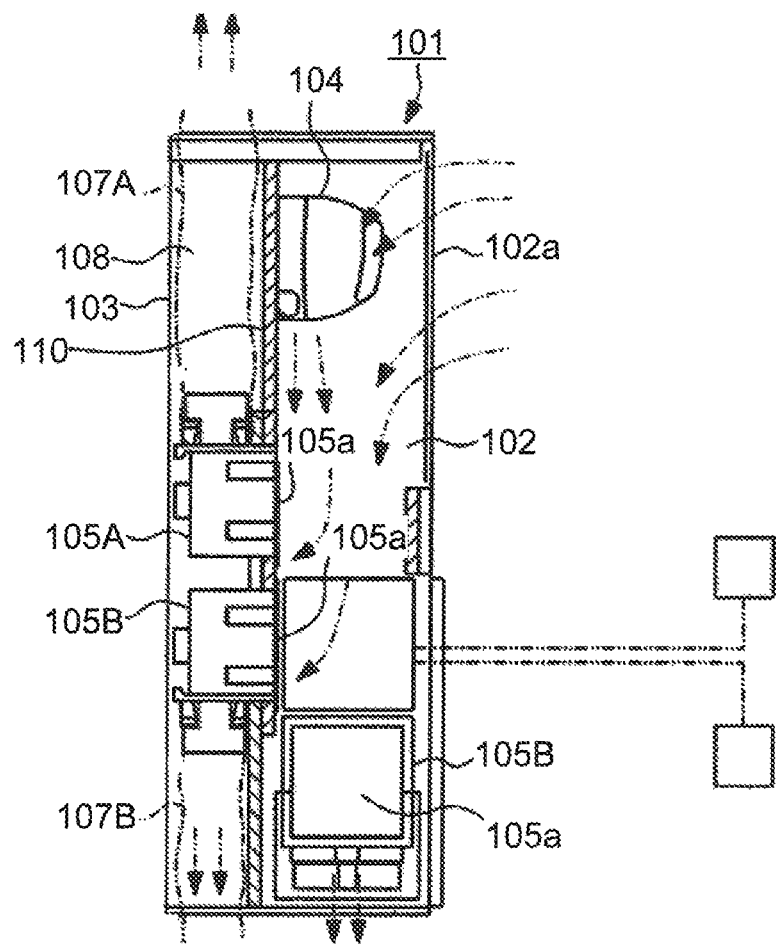

AIR CONDITIONING UNIT

TECHNICAL FIELD

The present invention relates to an air conditioning unit which is provided in a building and which conditions air of a plurality of rooms in a house by one or two air conditioners and a plurality of blowers.

BACKGROUND TECHNIQUE

There is a conventionally known air conditioning unit of this kind in which sucked air is adjusted in temperature by an air conditioner and then the air is sent to a plurality of rooms by blowers (see patent document 1 for example).

The conventional air conditioning unit will be described hereinafter with reference to FIG. 5.

As shown in FIG. 5, this air conditioning unit 101 includes a box-shaped casing 103, and an air inflow port 102a opens from the casing 103. A divider 110 divides an interior of the box-shaped casing 103 into a front-surface side chamber 102 and a back-surface side duct-placed chamber 108. An air conditioner body 104 is disposed in the divider 110 of the chamber 102 such that air conditioner body 104 is opposed to the air inflow port 102a. Three ceiling-surface side fans 105A are mounted on the divider 110 located below the air conditioner body 104, and three bottom-surface side fans 105B are mounted below the ceiling-surface side fans 105A of the divider 110. The bottom-surface side fans 105B are mounted on the bottom-surface side in a lower portion of the box-shaped casing 103 and in the chamber 102.

If the ceiling-surface side fans 105A, the bottom-surface side fans 105B and the air conditioner body 104 are operated, air outside the box-shaped casing 103 flows into the chamber 102 from the inflow port 102a. Air in the chamber 102 is adjusted in temperature or moisture by cool wind, warm wind or the like by means of the air conditioner body 104 of an upper portion in the chamber 102, and the air is sent downward of the chamber 102 by the air conditioner body 104.

The ceiling-surface side fans 105A and the bottom-surface side fans 105B disposed in a central portion and a lower portion of the chamber 102 suck air in the chamber 102 from a suction portion 105a, a ceiling-surface side duct 107A and a bottom-surface side duct 107B are vented, and the air is sent to a plurality of rooms.

PRIOR ART DOCUMENT

Patent Document

[Patent Document 1]
Japanese Patent Application Laid-open No. 2016-99087

SUMMARY OF THE INVENTION

Problem to be Solved by the Invention

According to such a conventional air conditioning unit 101, if volume of air sent to the plurality of rooms by the blowers is greater than volume of blown-out air of the air conditioner, a portion of air sucked into the chamber 102 by the blowers is sucked into the air conditioner, and remaining air bypasses the air conditioner and flows in the chamber 102. Also depending upon a position of an opening through which air is taken into the chamber 102, air bypasses the air conditioner and flows in the chamber 102. If air which is blown out from the air conditioner and whose temperature is adjusted in the chamber 102 and air which bypasses the air conditioner and whose temperature is not adjusted are not mixed with each other in the chamber 102 and sucked into the plurality of blowers, temperatures of air sent to the rooms differ between the rooms, temperature differences are generated between the plurality of rooms, and there is a problem that air conditioning cannot sufficiently be performed depending upon the rooms. Hence, it is required that air which is blown out from the air conditioner and whose temperature is adjusted and air which bypasses the air conditioner and whose temperature is not adjusted are mixed with each other before the plurality of blowers, and the air having no temperature difference is sent to the rooms.

The present invention has been accomplished to solve the conventional problem, and it is an object of the invention to provide an air conditioning unit capable of mixing, with each other, air which is blown out from the air conditioner and whose temperature is adjusted and air which bypasses the air conditioner and whose temperature is not adjusted.

Means for Solving the Problem

To achieve the above object, according to an air conditioning unit of the present invention, the chamber is provided therein with a divider which divides an interior of the chamber into one space where the air conditioner is placed and an other space where the blowers are placed, the air conditioning unit further includes an air inflow port for introducing the air from outside of the chamber into the one space, and the divider forms a divider opening.

According to this means, air which is blown out from the air conditioner and whose temperature is adjusted and air which bypasses the air conditioner and whose temperature is not adjusted are mixed with each other in the divider opening. Therefore, air having a small temperature difference can be sucked into the blowers, and air having a small temperature difference can be sent to the rooms.

Further, in the air conditioning unit of the invention, the air inflow port is provided in an upper portion of the front surface wall, the air conditioner is placed in an upper portion of the equipment-mounting wall, the air inflow port is opposed to the air conditioner, and the divider is provided in lower portions of the air inflow port and the air conditioner.

According to this means, a portion of air which flows in from the air inflow port is sucked into the air conditioner, air which is not sucked into the air conditioner and whose temperature is not adjusted is mixed in the divider opening with air which is blown out from the air conditioner and whose temperature is adjusted. Therefore, air introduced from the divider opening into the other space has a small temperature difference.

Further, in the air conditioning unit of the invention, a width of the divider opening is a spout region width of spout air current of the air conditioner.

According to this means, mixture between air which is blown out from the air conditioner and whose temperature is adjusted and air which bypasses the air conditioner and whose temperature is not adjusted can be facilitated.

Further, the air conditioning unit of the invention further includes one more air conditioner, the two air conditioners are disposed in a horizontal direction of the air conditioning unit, and a width of the divider opening is a spout region width of spout air current of the air conditioner.

According to this means, air which is blown out from the air conditioner and whose temperature is adjusted and air which bypasses the air conditioner and whose temperature is not adjusted are mixed with each other in the divider opening and sucked into the plurality of blowers, and air having a small temperature difference can be sent to the rooms.

Further, in the air conditioning unit of the invention, the divider is attachably and detachably provided in the chamber.

According to this means, a size of the divider opening can be adjusted by replacing the divider on an installation site.

Further, the air conditioning unit of the invention further includes a straightening vane for introducing spout air current of the air conditioner into the divider opening.

According to this means, air which is blown out from the air conditioner and whose temperature is adjusted and air which bypasses the air conditioner and whose temperature is not adjusted can be mixed with each other, and air having a small temperature difference can be sent to the rooms.

Effect of the Invention

According to the present invention, it is possible to provide an air conditioning unit having an effect that air having a small temperature difference can be sent to rooms.

Further, after installing an air conditioning unit in a building, it is possible to provide an air conditioning unit having an effect that adjustment can be performed while carrying out a test run.

BRIEF DESCRIPTION OF THE DRAWINGS

FIG. 1 is a side view of a configuration of an air conditioning unit according to a first embodiment of the present invention;

FIG. 2 is a front view of the configuration of the air conditioning unit;

FIG. 3 is a plan view of the configuration of the air conditioning unit;

FIG. 4 is a front view of a configuration of an air conditioning unit of a second embodiment of the invention; and FIG. 5 is a view of a configuration of a conventional air conditioning unit.

MODE FOR CARRYING OUT THE INVENTION

In an embodiment of the present invention, total blast volume of a plurality of blowers 5 is set larger than that of an air conditioner 20, and the air conditioner 20 is disposed upstream of air current in a chamber 3 formed by the plurality of blowers 5. Dividers 36 and 38 are disposed in the chamber 3 located downstream of the air conditioner 20 such that a divider opening 42 having a size corresponding to a spout region width of spout air current 26 of the air conditioner 20 is formed. The size corresponding to the spout region width of the spout air current 26 of the air conditioner 20 is in a range of 0.8 to 1.4 times of the spout region width of the spout air current 26 of the air conditioner 20, and is more preferably in a range of 1.0 to 1.2 times thereof. The divider opening 42 has the size corresponding to the spout region width of the spout air current 26 of the air conditioner 20. The spout air current 26 of the air conditioner 20 and chamber interior air current 34 which bypasses the air conditioner 20 are mixed in the divider opening 42. That is, air (spout air current 26) which is blown out from the air conditioner 20 and whose temperature is adjusted and air (chamber interior air current 34) which bypasses the air conditioner 20 and whose temperature is not adjusted are stirred and become air having a small temperature difference and is sucked into the plurality of blowers 5 and the air is sent to the rooms.

According to the embodiment of the invention, two air conditioners 51 and 52 are disposed side by side in a horizontal direction of the air conditioning unit at locations upstream of the chamber interior air current 34 which is formed by the plurality of blowers 5. Dividers 53 and 54 are disposed in the chamber 3 located downstream of the two air conditioners 51 and 52 such that a divider opening 64 having a size corresponding to a spout region width of spout air current 61, 62 of one of the air conditioners 51 and 52 is formed. Also when the two air conditioners 51 and 52 are disposed in this manner, the divider opening 64 is in a range of 0.8 to 1.4 times of the spout region width of any of the first air conditioner 51 and the second air conditioner 52, and is more preferably in a range of 1.0 to 1.2 times thereof. By providing the divider opening 64 having the size corresponding to the spout region width of any one of the first air conditioner 51 and the second air conditioner 52, even if one of the air conditioners 51 and 52 of the two air conditioners 51 and 52 is shut down, the spout air current 61 and 62 of the air conditioners 51 and 52 and the chamber interior air current 34 which bypasses the air conditioners 51 and 52 are mixed with each other by the divider opening 64 having the size corresponding to the spout region widths of the spout air current 61 and 62 of the air conditioners 51 and 52, the spout air current 61 and 62 of the air conditioners 51 and 52 and the chamber interior air current 34 which bypasses the air conditioners 51 and 52 are stirred and then, the current is sucked into the plurality of blowers 5 and sent to the rooms.

Further, in the embodiment of the invention, the air conditioner 20 is disposed upstream of the chamber interior air current 34 which is formed by the plurality of blowers 5, and a straightening vane 46 which extends from a front surface of the air conditioner 20 to a front surface wall 31 which is opposed to the front surface is provided in adjacent to a spout air current region of the air conditioner 20. The straightening vane 46 blocks a flow of the chamber interior air current 34 which bypasses the air conditioner 20, the spout air current 26 of the air conditioner 20 is mixed with the chamber interior air current 34 which bypasses the air conditioner 20 after the spout air current 26 reaches the opposed front surface wall 31, the spout air current 26 of the air conditioner 20 and the chamber interior air current 34 which bypasses the air conditioner 20 are stirred and then, the current is sucked into the plurality of blowers 5 and sent to the rooms.

The embodiments of the present invention will be described hereinafter with reference to the drawings.

First Embodiment

A first embodiment of the present invention is shown in FIGS. 1 to 3.

FIG. 1 is a side view of a configuration of an air conditioning unit according to the first embodiment, FIG. 2 is a front view of the configuration of the air conditioning unit and FIG. 3 is a plan view of the configuration of the air conditioning unit.

As shown in the drawings, the air conditioning unit 2 is provided on one corner of a first or second floor of a building 1. The air conditioning unit 2 is a feature product in the building 1. Therefore, the air conditioning unit 2 is subjected to the restriction by a room plan of the building 1. To secure an interior space of a room, an area of the air conditioning unit 2 is kept to the minimum. The air conditioning unit 2 is disposed between pillars of the building 1. Therefore, in a general or average house having a floor space of about 99.15 to 132.20 m², a width of the air conditioning unit 2 is about 1.65 m², a depth thereof is basically 910 mm and a width thereof is basically 1820 mm. The depth can be widened up to 1365 mm in some cases.

A chamber 3 is formed in the air conditioning unit 2. The chamber 3 is formed into a box shape. A front side of the box shape is covered with a front surface wall 31, a rear side thereof is covered with a rear surface wall 30, a side thereof is covered with a chamber right side wall 43 and a chamber left side wall 37, an upper side thereof is covered with an upper plate 16 and a lower side thereof is covered with a lower plate 17. The chamber 3 is provided with an equipment-mounting wall 4 therein. An air conditioner 20 and a plurality of blowers 5 are installed on the equipment-mounting wall 4. The air conditioner 20 is installed on an upper portion of the equipment-mounting wall 4 and the plurality of blowers 5 are installed on a lower portion of the equipment-mounting wall 4. In this embodiment, five upper stage blowers 6a, five middle stage blowers 6b and five lower stage blowers 6c are disposed side by side. However, the number of the plurality of blowers 5 differs depending upon a size of the building 1. All of the blowers 5 have the same configurations. Box-shaped blower casings 7 are respectively provided with sirocco fans 8, and blower suction ports 9 open toward the chamber 3. Suction grilles 10 are attached to the blower suction ports 9 respectively. Ducts 12 are attached to a blower spout port 11.

The ducts 12 are disposed to send air to respective rooms of the building 1. The duct 12 connected to the upper stage blowers 6a is led upward from the air conditioning unit 2 through a duct space 13 formed between the equipment-mounting wall 4 and the air conditioning unit 2, the duct 12 is disposed in a roof-space 14 and air is sent to the respective rooms. The other ducts 12 which are connected to the middle stage blowers 6b and the lower stage blowers 6c are led downward of the air conditioning unit 2, these ducts 12 are disposed under floor 15 and air is sent to the respective rooms. To avoid the overlapping with the duct 12 of the middle stage blower 6b, the lower stage blower 6c is disposed on the inner side than the middle stage blowers 6b. An inner diameter of the duct 12 is about ϕ150 mm, and duct holes (not shown) open into the upper plate 16 and the lower plate 17 of the air conditioning unit 2. The ducts 12 are fitted into and pass through the duct holes.

The air conditioner 20 is indoor equipment of a separate type room air conditioner, an air conditioner suction port 21 is formed in an upper portion of its body, and an air conditioner spout port 22 is formed in a lower portion of the body. The air conditioner spout port 22 is provided with a vertical wind-direction changing blade 23. The ability of the air conditioner 20 is determined based on thermal load calculation which depends on a size and the like of the building 1, and the air conditioner 20 is disposed on an upper portion of the equipment-mounting wall 4 and above the plurality of blowers 5. A width of the plurality of blower suction ports 9 which are continuously connected to one another is larger than a lateral width of the air conditioner spout port 22, and the air conditioner 20 is disposed such that a horizontal center of the plurality of blower suction ports 9 and an air conditioner spout port center line 24 substantially coincide with each other. If the air conditioner 20 is operated, air conditioner suction air current 25 flowing toward the air conditioner suction port 21 and air conditioner spout air current 26 whose wind direction is controlled by the vertical wind-direction changing blade 23 are formed. The air conditioner spout air current 26 forms a lateral spout region 27 and a vertical spout region 28, and air passes through these regions. More precisely, the air conditioner spout port center line 24 means a center line of the lateral spout region 27, and this center line and a center line of the vertical wind-direction changing blade 23 do not coincide with each other in some cases depending on the air conditioner 20.

An air inflow port 32 opens into an upper portion of the front surface wall 31 of the chamber 3 such that the air inflow port 32 is opposed to the air conditioner 20. Air which is sent from the chamber 3 into the respective rooms by the plurality of blowers 5 is discharged from the rooms to a corridor or the like. The air discharged into the corridor or the like is sucked into the air inflow port 32. According to this, air current caused by the plurality of blowers 5 circulates through the building 1, the air current becomes return air current 33, the return air current 33 returns from the air inflow port 32 into the chamber 3 and chamber interior air current 34 is formed. Therefore, the air conditioner 20 is located upstream of the chamber interior air current 34 which is formed by the plurality of blowers 5. If blast volume of the plurality of blowers 5 is larger than blast volume of the air conditioner 20, since all of the chamber interior air current 34 cannot pass through the air conditioner 20, bypass air current 35 which bypasses the air conditioner 20 from the air inflow port 32 is generated. That is, the air conditioner spout air current 26 and the bypass air current 35 join together and become the chamber interior air current 34.

Although the air inflow port 32 opens into the upper portion of the chamber 3, it is also possible to provide a vent hole in a ceiling of the corridor and bring the roof-space 14 and the respective rooms into communication with each other, and to suck the air from the roof-space 14 in the upper portion of the chamber 3.

An adjustment is made such that the vertical wind-direction changing blade 23 is directed diagonally downward, the vertical spout region 28 joins with the bypass air current and they flow into the chamber 3, and they become the chamber interior air current 34. At this time, an upper side of the vertical spout region 28 is located at a lower end of the air inflow port 32. Even if a very small amount of the air conditioner spout air current 26 blows out of the chamber 3 through the lower end of the air inflow port 32, the spout air returns by the return air current 33 and thus, there is no problem in terms of performance, and it is possible to adjust the air current while checking this situation by a test run.

A right divider 36 surrounded by the chamber right side wall 43, the equipment-mounting wall 4 and the front surface wall 31, as well as a left divider 38 surrounded by the chamber left side wall 37, the equipment-mounting wall 4 and the front surface wall 31 are provided between the air conditioner 20 and the plurality of blowers 5. Both the right divider 36 and the left divider 38 are attachably and detachably held at locations lower than a lower end of the air inflow port 32 by the front surface wall 31 and a divider holding member 39 fixed to the equipment-mounting wall 4. A left end 40 of the right divider 36 is set such that it does not enter the lateral spout region 27. A right end 41 of the left divider 38 is also set such that it does not enter the lateral spout region 27. That is, a portion between the left end 40 of the right divider 36 and the right end 41 of the left divider 38 becomes a divider opening 42. An interior of the chamber 3 is divided by the right divider 36 and the left divider 38 into one space in which the air conditioner 20 is disposed and the other space in which the blowers 5 are disposed. The right divider 36 and the left divider 38 are provided at lower portions of the air inflow port 32 and the air conditioner 20.

A straightening vane 46 is disposed such that its center is aligned with the air conditioner spout port center line 24. The straightening vane 46 has a lateral width L1 in the range of ⅓ to ⅙, especially about ⅕ of a width of the air conditioner spout port 22. The straightening vane 46 is held by a straightening vane-holding member 47 from a lower end of the air inflow port 32, and is disposed such that it extends upward the air conditioner spout port 22. A direction of the vertical wind-direction changing blade 23 is set such that an upper portion of the vertical spout region 28 extends along the straightening vane 46.

In the above-described configuration, if the plurality of blowers 5 and the air conditioner 20 are operated, spout air whose temperature is adjusted by the air conditioner 20 is sucked into the plurality of blowers 5, the air is blown into the respective rooms, and the rooms are air-conditioned. The air which is blown into the rooms returns from the air inflow port 32 into the air conditioning unit 2. At this time, the returned air is divided into the air conditioner suction air current 25 and the bypass air current 35 in the upper portion of the chamber 3. The temperature of the air conditioner suction air current 25 is adjusted and becomes air conditioner spout air current 26, and a temperature difference is generated between the air conditioner spout air current 26 and the bypass air current 35. The air conditioner spout air current 26 and the bypass air current 35 join together while being mixed together by the divider opening 42 having an area which is smaller than a horizontal cross section of the chamber 3. Therefore, they are stirred there and become the chamber interior air current 34 having a small temperature difference. Thereafter, they are diffused and blown into the rooms by the plurality of blowers 5, and air having a small temperature difference can be blown into the rooms.

Further, at a location where the upper portion of the vertical spout region 28 is covered with the straightening vane 46, the air conditioner spout air current 26 is not mixed with the bypass air current 35 but flows to the front surface wall 31 and thereafter, the air conditioner spout air current 26 is flowed back and mixed with the bypass air current 35. Therefore, mixed portions increase, the mixture is further stirred by the divider opening 42 and becomes the chamber interior air current 34. For the purpose of widening the lateral spout region 27, a pair of right and left wind direction blades (not shown) are disposed in the air conditioner spout port 22, and a direction of the air conditioner spout air current 26 can laterally be changed. Even if the right and left wind direction blades (not shown) are laterally directed and air spouts widely toward both sides of the air conditioner 20, an influence of the right and left wind direction blades (not shown) is not exerted at a portion of the air conditioner spout port center line 24, the air spouts toward the front surface and thus, the straightening vane 46 functions.

The air conditioning unit 2 is prepared on a construction site, it is subjected to the restriction of a room plan as described above and its volume becomes almost the same as that described above, and an equipment layout configuration thereof becomes similar to that described above. On the other hand, the ability of the air conditioner 20 accommodated in the air conditioning unit 2 is selected in accordance with a thermal load of the building 1. In addition, a size and an air volume differ depending upon different makers. Hence, since the air volumes of a plurality of blowers differ depending on a size of the building 1, an adjustment of the operation is necessary.

To adjust the operation of the air conditioning unit 2, directions and sizes of the vertical spout region 28 and the lateral spout region 27 are set. In order to operate the air conditioner 20 in its optimal state, the adjustment is made not to generate a so-called short circuit in which a portion of the air conditioner spout air current 26 collides against the front surface wall 31 and is inverted, and becomes the air conditioner suction air current 25, and the adjustment is made to smoothly carry out ventilation of the air conditioner spout air current 26. Depending upon a distance between the air conditioner 20 and the front surface wall 31, some advantages can be gained in some cases for the operation state of the air conditioner 20 by widening the lateral spout region 27 by the lateral wind direction blades (not shown).

Next, a position and a width of the divider opening 42 are adjusted so that the chamber interior air current 34 joins while being mixed by the divider opening 42, they are stirred and a temperature different becomes small.

Hence, the right divider 36 and the left divider 38 are previously prepared in accordance with a size L2 from the chamber right side wall 43 to the air conditioner spout port 22, and a size L3 from the chamber left side wall 37 to the air conditioner spout port 22. The sizes L2 and L3 are adjusted such that these sizes do not overlap with the lateral spout region 27 while carrying out a test run. The right divider 36 and the left divider 38 are attachably and detachably installed using square flat plates, and the air conditioning unit 2 which can easily be operation-adjusted on a construction site is provided.

If workability at the time of the adjustment is taken into account, optimal materials of the right divider 36 and the left divider 38 are wood plate or hard resin foam material.

Second Embodiment

As shown in FIG. 4, a first air conditioner 51 and a second air conditioner 52 are disposed side by side in a horizontal direction on an upper portion of an equipment-mounting wall 4 of an air conditioning unit 50. Each of the first air conditioner 51 and the second air conditioner 52 is indoor equipment of a separate type room air conditioner. In the second embodiment, description of the same configurations as those of the first embodiment will be omitted.

A first divider 53 surrounded by a chamber right side wall 43, an equipment-mounting wall 4 and a front surface wall 31, as well as a second divider 54 surrounded by a chamber left side wall 37, the equipment-mounting wall 4 and the front surface wall 31 are provided in a chamber 3 between the first air conditioner 51, the second air conditioner 52 and a plurality of blowers 5. Both the first divider 53 and the second divider 54 are attachably and detachably held at locations lower than a lower end of an air inflow port 32 by the front surface wall 31 and a divider holding member 55 fixed to the equipment-mounting wall 4. A left end 56 of the first divider 53 is set such that it coincides with a spout port center line 57 of the first air conditioner 51, and a right end 58 of the second divider 54 is set such that it coincides with a spout port center line 59 of the second air conditioner 52. That is, a space between the left end 56 of the first divider 53 and the right end 58 of the second divider 54 becomes a divider opening 65. By adjusting right and left wind-direction changing blades (not shown) of an air conditioner spout air current 61 of the first air conditioner 51 and an air conditioner spout air current 62 of the second air conditioner 52, a width of a first lateral spout region 63 by the air conditioner spout air current 61 and a width of a second lateral spout region 64 by the air conditioner spout air current 62 are set equal to each other, and air is blown out toward the divider opening 65. The air conditioner spout air current 61 forms the first lateral spout region 63, and the air conditioner spout air current 62 forms the second lateral spout region 64. Air passes through an interior of the chamber 3 such that these spout regions overlap with each other.

In the above-described configurations, if the plurality of blowers 5, the first air conditioner 51 and the second air conditioner 52 are operated, blown-out air whose temperature is adjusted by the first air conditioner 51 and the second air conditioner 52 joins with bypass air current 35 in the divider opening 65 and is stirred and thereafter, the air is diffused and sucked by the plurality of blowers 5 and sent into the rooms, and air having a small temperature difference can be sent into the rooms. The air sent into the rooms returns to the air conditioning unit 2.

The first air conditioner 51 and the second air conditioner 52 are not always operated in the same manner. Even if the temperature of the air conditioner suction air current 25 is the same, it may be assumed in some cases that temperature of one of the air conditioners reaches a set temperature due to variation of suction sensors of the first air conditioner 51 and the second air conditioner 52, and only the air-sending operation may be carried out or the air-sending operation may be stopped. Further, the air-sending operation of one of the air conditioners may be stopped in some cases by a defrosting operation of outdoor equipment at the time of a heating operation. In this case also, by the above-described configurations, blown-out air whose temperature is adjusted by the first air conditioner 51 or the second air conditioner 52 joins with the bypass air current 35 in the divider opening 65 and is stirred and thereafter, the air is diffused and sucked by the plurality of blowers 5 and is sent into the rooms, and air having a small temperature difference can be sent into the rooms.

As shown in the first embodiment, the air conditioning unit 50 is adjusted on a construction site, sizes of the first divider 53 and the second divider 54, a position and a width of the divider opening 65 are also adjusted on the construction site.

When a depth of the air conditioning unit 2 exceeds 910 mm, a third divider (not shown) is provided on the side of the equipment-mounting wall 4 of the divider opening 42. If the third divider is provided such that it extends from the right divider 36 to the left divider 38, a depth of the divider opening 42 is made narrow.

INDUSTRIAL APPLICABILITY

The present invention is suitable for a house having a plurality of rooms, but the invention can also be applied to a building such as a commercial facility and a hospital having a large floor space.

EXPLANATION OF SYMBOLS 1 building
2 air conditioning unit
3 chamber
4 equipment-mounting wall
5 blower
6a upper stage blower
6b middle stage blower
6c lower stage blower
7 blower casing
8 sirocco fan
9 blower suction port
10 suction grille
11 blower spout port
12 duct
13 duct space
14 roof-space
15 under floor
16 upper plate
17 lower plate
20 air conditioner
21 air conditioner suction port
22 air conditioner spout port
23 vertical wind-direction changing blade
24 air conditioner spout port center line
25 air conditioner suction air current
26 air conditioner spout air current
27 lateral spout region
28 vertical spout region
30 rear surface wall
31 front surface wall
32 air inflow port
33 return air current
34 chamber interior air current
35 bypass air current
36 right divider
37 chamber left side wall
38 left divider
39 divider holding member
40 left end
41 right end
42 divider opening
43 chamber right side wall
46 straightening vane
47 straightening vane-holding member
50 air conditioning unit
51 first air conditioner
52 second air conditioner
53 first divider
54 second divider
55 divider holding member
56 left end
57 spout port center line
58 right end
59 spout port center line
61 air conditioner spout air current
62 air conditioner spout air current
63 first lateral spout region
64 second lateral spout region
65 divider opening
L1 lateral width
L2 size
L3 size

The invention claimed is:

1. An air conditioning unit comprising an air conditioner and a plurality of blowers both provided in a chamber, in which the chamber has a box shape, a front side of the chamber is covered with a front surface wall, a rear side of the chamber is covered with a rear surface wall, both sides of the chamber are respectively covered with a chamber right side wall and a chamber left side wall, an upper side of the chamber is covered with an upper plate and a lower side of the chamber is covered with a lower plate, an equipment-mounting wall on which the air conditioner and the blowers are placed is provided in the chamber, and air whose temperature is adjusted by the air conditioner is sucked by the blowers, and the sucked air is sent from ducts connected to the blowers, thereby air-conditioning a plurality of rooms of a house, wherein the chamber is provided therein with a divider which divides an interior of the chamber into one space where the air conditioner is placed and an other space where the blowers are placed, the air conditioning unit further comprises that an air inflow port for introducing the air from outside of the chamber into the one space is provided facing the air conditioning unit, a chamber right side wall and a chamber left side wall, the divider is provided lower than a lower end of the air inflow port, the divider is composed of a right divider provided on the chamber right side wall side and a left divider provided on the chamber left side wall side, the divider forms a divider opening between the right divider and the left divider, a width of the divider opening is a lateral spout region width formed where the air conditioner is operated, and the air returned from the air inflow port is divided into an air conditioner suction air current and a bypass air current, and join together while being mixed together by the divider opening.

2. The air conditioning unit according to claim 1, further comprising one more air conditioner, wherein
the two air conditioners are disposed in a horizontal direction of the air conditioning unit, and
a width of the divider opening is a lateral spout region width of spout air current of one air conditioner.

3. The air conditioning unit according to claim 1, wherein the divider is attachably and detachably provided in the chamber.

4. The air conditioning unit according to claim 1, further comprising a straightening vane for introducing spout air current of the air conditioner into the divider opening,
the straightening vane is disposed such that its center is aligned with the air conditioner spout port center line and has a lateral width in the range of $\frac{1}{3}$ to $\frac{1}{6}$ of a width of the air conditioner spout port, and
by covering an upper portion of a vertical spout region formed where the air conditioner is operated with the straightening vane, it is divided into the air conditioner suction air current and the bypass air current, and the spout air current is not mixed with the bypass air current but flows to the front surface wall and thereafter mixed with the bypass air current.

* * * * *

UNITED STATES PATENT AND TRADEMARK OFFICE
CERTIFICATE OF CORRECTION

PATENT NO. : 10,974,569 B2
APPLICATION NO. : 16/214402
DATED : April 13, 2021
INVENTOR(S) : Kazuro Hiroshi Page 1 of 1

It is certified that error appears in the above-identified patent and that said Letters Patent is hereby corrected as shown below:

In the Claims

Column 11, Line 12, Claim 1, cancel the text beginning with "conditioning unit" to and ending with "side wall" in Column 11, Line 13, and insert the following:
--conditioner--

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*